United States Patent
Checoury et al.

(10) Patent No.: US 6,947,713 B2
(45) Date of Patent: Sep. 20, 2005

(54) AMPLITUDE- AND FREQUENCY- OR PHASE-MODULATED RADIO FREQUENCY SIGNAL GENERATOR AND THE TRANSMITTER INCORPORATING SAME

(75) Inventors: Xavier Checoury, Paris (FR); Olivier Gagey, Paris (FR)

(73) Assignee: EADS Telecom, Montigny le Bretonneux ( * ) Notice: Subject to any disclaimer, the term of this patent is extended or adjusted under 35 U.S.C. 154(b) by 122 days.

(21) Appl. No.: 10/476,801
(22) PCT Filed: Apr. 29, 2002
(86) PCT No.: PCT/FR02/01483
§ 371 (c)(1), (2), (4) Date: Nov. 4, 2003
(87) PCT Pub. No.: WO02/091698
PCT Pub. Date: Nov. 14, 2002

(65) Prior Publication Data
US 2004/0132470 A1 Jul. 8, 2004

(30) Foreign Application Priority Data
May 4, 2001 (FR) .......................................... 01 06006

(51) Int. Cl.[7] .............................................. H01Q 11/12
(52) U.S. Cl. ..................... 455/126; 455/114.3; 455/522
(58) Field of Search ................................ 455/126, 501, 455/127.2, 114.3, 115.1, 522, 24, 278.1; 330/149; 332/144, 145, 149, 150, 117, 120

(56) References Cited

U.S. PATENT DOCUMENTS

| | | | | | |
|---|---|---|---|---|---|
| 5,105,445 | A | * | 4/1992 | Karam et al. ............... | 375/296 |
| 5,430,416 | A | * | 7/1995 | Black et al. ................. | 332/145 |
| 5,978,662 | A | * | 11/1999 | Swales ........................ | 455/126 |
| 6,070,086 | A | * | 5/2000 | Dobrica ...................... | 455/522 |
| 6,112,062 | A | * | 8/2000 | Hans et al. ............... | 455/114.3 |
| 6,163,708 | A | * | 12/2000 | Groe ........................... | 455/522 |
| 6,295,442 | B1 | * | 9/2001 | Camp et al. ................ | 455/102 |
| 6,633,751 | B1 | * | 10/2003 | Damgaard et al. .......... | 455/126 |
| 6,801,784 | B1 | * | 10/2004 | Rozenblit et al. ........... | 455/522 |
| 2002/0191710 | A1 | * | 12/2002 | Jeckeln et al. .............. | 375/296 |
| 2004/0162039 | A1 | * | 8/2004 | Marque-Pucheu .......... | 455/126 |
| 2005/0017801 | A1 | * | 1/2005 | Bachman et al. ........... | 330/149 |

FOREIGN PATENT DOCUMENTS

FR  2 807 252  10/2001

OTHER PUBLICATIONS

Mann S et al: "Increasing Talk–Time With Efficient Linear PA's" IEE Seminar ontetra market and technology developments, IEE, London GB, (Feb. 10, 2000), pp. 6–1–6–7 p. 5, line 16–line 34 fig. 6.
Petrovic V et al: "The Design of VHF SSb Polar–Loop Transmitters" Conference on communications equipment and systems. Apr. 20–22, 1982, London, I.E.E., GB. vol. No. 209 Apr. 1982, p. 148.
International Search Report PCT/FR02/01483 dated Aug. 13, 2002.

* cited by examiner

*Primary Examiner*—Sonny Trinh
(74) *Attorney, Agent, or Firm*—McCracken & Frank LLP

(57) ABSTRACT

An amplitude- and frequency- or phase-modulated radio frequency signal generator that is used for radio emission, generates a phase or frequency control signal and an amplitude control signal from a phase or frequency modulation signal and from an amplitude modulation signal respectively. The generator comprises a phase or frequency modulator and a variable-gain radio frequency power amplifier. The amplitude of the output signal is automatically controlled. In addition, adaptive pre-distortion is carried out in order to pre-distort the phase or frequency control signal in accordance with the amplitude modulation signal during a permanent operating phase. During a learning phase, a pre-distortion module is adapted from the amplitude modulation signal and from the amplitude control signal.

12 Claims, 3 Drawing Sheets

FIG.1.
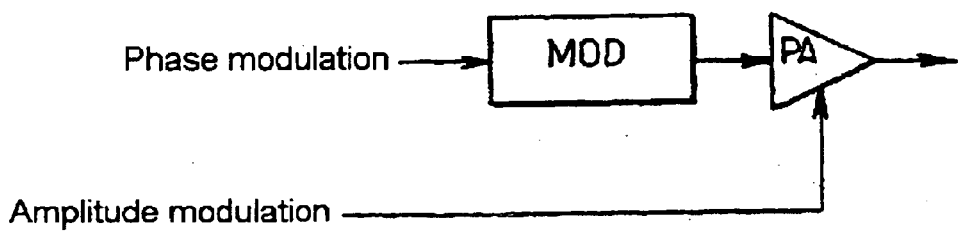
FIG.2.
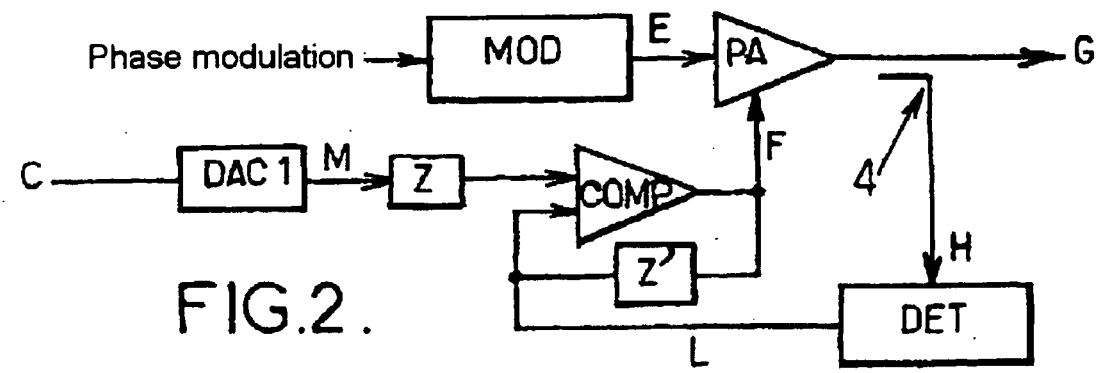
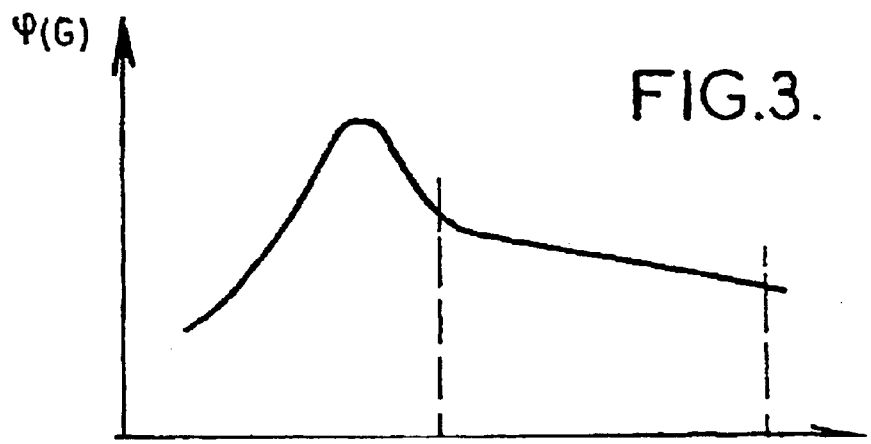
FIG.3.

FIG.6.
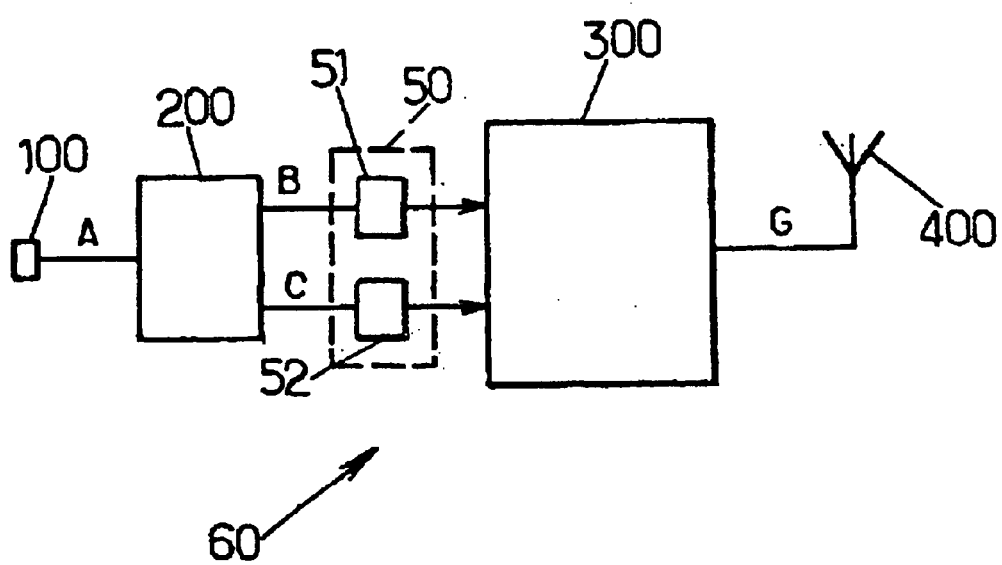
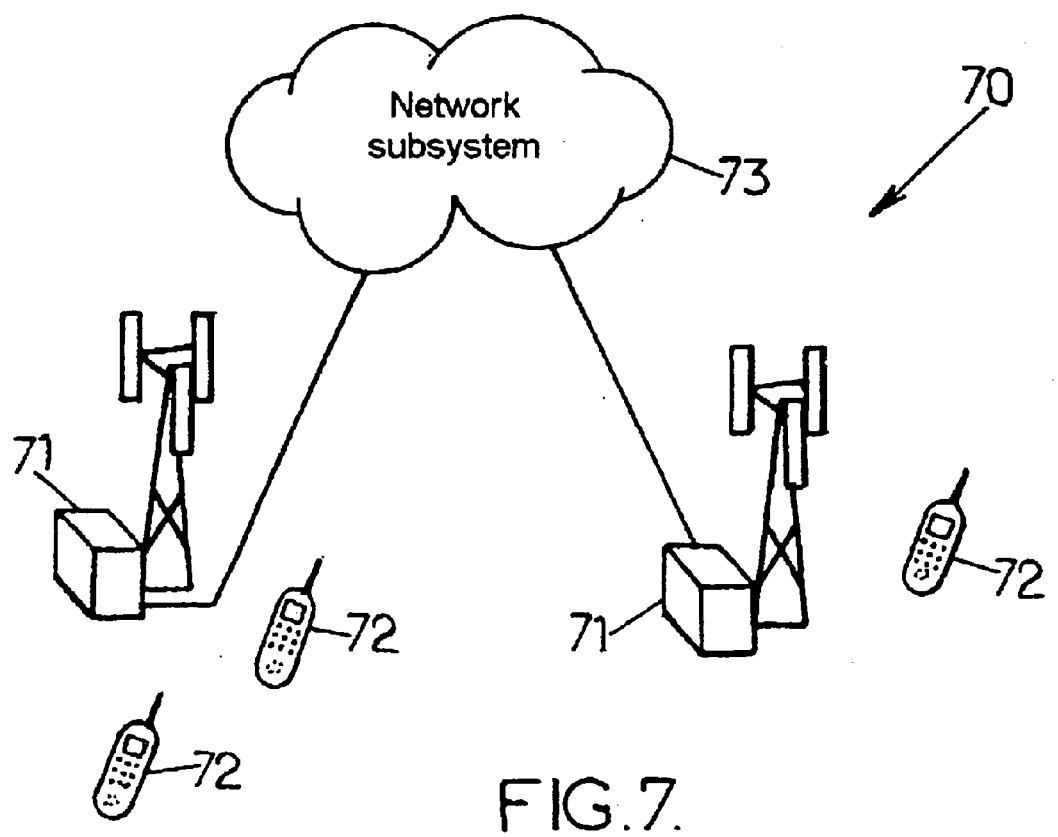
FIG.7.

AMPLITUDE- AND FREQUENCY- OR PHASE-MODULATED RADIO FREQUENCY SIGNAL GENERATOR AND THE TRANSMITTER INCORPORATING SAME

TECHNICAL FIELD

Related Art

The present invention relates to a generator of a radiofrequency signal that is modulated, on the one hand, in phase or in frequency, and, on the other hand, in amplitude, suitable for radio transmission via an antenna or a cable, as well as to a transmitter incorporating same.

Such a generator finds applications in radio transmitters, in particular of mobile stations or of fixed stations of a radiocommunications system, for example a private system for professional radiocommunications (or PMR system, the abbreviation standing for "Private Mobile Radiocommunication").

BACKGROUND OF THE INVENTION

Current radiocommunications systems conventionally use, for the transmission of digital data coding an audio signal or, more generally, information of any kind, so-called constant envelope modulations. With such modulations, the data transmitted are not carried by the amplitude of a radiofrequency carrier but by its phase or its frequency.

However, it is currently sought to transmit more information within a frequency band of given width, assigned to a transmission channel, in such a way as to increase the spectral efficiency of radiocommunications systems. The aim is to respond to the increase in traffic demand within the radiofrequency spectrum, while complying with the constraints related to the sharing of this spectrum. This is why reintroduction of amplitude modulation is envisioned, in addition to phase or frequency modulation. Thus, one seeks to devise new radiocommunications systems using, for the transmission of information, composite modulation, comprising both a phase modulation component and an amplitude modulation component.

Despite this, because of the need to maintain considerable power efficiency of the transmitter (which is particularly necessary within the context of use of the transmitter in a handheld radiocommunications appliance), the radiofrequency power amplifier is still operated in an operating zone close to saturation.

Now, as is known, in such an operating zone, the transmitter exhibits nonlinearities of amplification comprising amplitude nonlinearities and phase nonlinearities. In the literature, these amplitude and phase nonlinearities are often designated by the terms amplitude/amplitude conversions (or AM/AM conversions) and amplitude/phase conversions (or AM/PM conversions) respectively. These nonlinearities give rise to amplitude distortion and phase distortion of the signal transmitted, which degrade the performance of the transmitter in terms of transmission quality.

It is therefore desirable to cancel out the effects of the amplification nonlinearities induced by the radiofrequency power amplifier, so as not to degrade the quality of transmission. Several techniques are known, that allow this result to be obtained.

In the CLLT (standing for "Cartesian Loop Linear Transmitter") technique, the signal to be transmitted is firstly generated in baseband. A modulator provides for the conversion of the baseband signal to the radiofrequency domain (upconversion). Finally, the radiofrequency signal is amplified in the power amplifier. A coupler followed by a demodulator make it possible to tap off part of the radiofrequency signal at the output of the power amplifier and to convert it to baseband (downconversion). The signal generated in baseband is compared with the signal thus demodulated in baseband, by means of a comparator whose output drives the modulator. Analog feedback control of the transmitted radiofrequency signal by the signal generated in baseband is thus performed. This feedback control makes it possible to cancel out the nonlinearities present in the upconversion chain, in particular the nonlinearities induced by the modulator and by the radiofrequency power amplifier. The linearization performance of this technique is however limited by the passband of the feedback control loop. For problems of stability of the feedback control loop, the loop gain is in fact generally small, thereby resulting in a correction of the limited nonlinearities. Usually, it is necessary to include a detector of instability of the feedback control loop. Furthermore, the spectral purity is limited by the presence of a conventional modulator in the upconversion chain.

In the ABP (standing for "Adaptive Baseband Predistortion") technique, adaptive predistortion is applied to the signal generated in baseband, generally by digital processing. The predistorted signal is generated in baseband, via a digital/analog converter. Then, the predistorted signal is converted to the radiofrequency domain (upconversion) by virtue of a modulator. Finally, the radiofrequency signal is amplified in the radiofrequency power amplifier. The predistortion makes it possible to cancel out the nonlinearities present in the upconversion chain, in particular the nonlinearities induced by the modulator and by the radiofrequency power amplifier. This is an adaptive predistortion. For this purpose, a coupler followed by a demodulator make it possible to tap off part of the radiofrequency signal transmitted and to convert it to baseband (downconversion). The signal demodulated in baseband is digitized and compared with the signal generated in baseband (desired signal). Adaptation of the predistortion coefficients then enables the signal thus demodulated to be made to converge to the desired signal. The downconversion chain therefore allows regular updating of the predistortion coefficients. This technique requires a learning phase, during which a degradation in the spectral purity of the transmission is very often permitted. The spectral purity is furthermore limited by the presence of a conventional modulator in the upconversion chain.

In the EER (standing for "Envelope Elimination and Restoration") technique, the principle of which is illustrated by the diagram of FIG. 1, the modulation of the radiofrequency signal to be transmitted is decomposed into a phase or frequency modulation component and an amplitude modulation component. These two components are generated in baseband. The phase or frequency modulation component drives a phase or frequency modulator MOD (for example a duplicating loop), that provides for the conversion of this component to the radiofrequency domain. The output signal from this modulator is a phase- or frequency modulated signal of substantially constant amplitude. This signal is amplified by virtue of the radiofrequency power amplifier PA. The amplitude modulation component is used, via adaptation circuits (not represented), to control the gain of the power amplifier PA. The power amplifier PA may be a hardware item comprising a gain control input or an assembly of hardware items comprising a gain control input. Thus, the amplitude modulation component is superimposed on the phase or frequency modulation component to obtain the desired radiofrequency signal at the output of the radiofrequency power amplifier PA. These two components use different paths to reach the output of the amplifier. To cancel out the nonlinearities, in particular those induced by the radiofrequency power amplifier PA, it is necessary to introduce devices for correcting these nonlinearities. A loop for analog feedback control of the amplitude modulation may be introduced, as shown in the diagram of FIG. 2, which will be described in detail later. This feedback control loop makes it possible to compensate for the amplitude nonlinearities. To compensate for the phase nonlinearities, it is possible to introduce, as for the CLLT or ABP techniques, a downconversion chain comprising a demodulator.

However, such a demodulator comprises a local oscillator for performing the conversion from the radiofrequency domain to the baseband. This local oscillator, not modulated, is at the same frequency as the signal to be transmitted. This raises complex problems of decoupling between this local oscillator and the signal to be transmitted, in particular for the radiofrequency transmitters of mobile stations by reason of the constraints related to their compactness. Moreover, the synthesis spacing of this local oscillator is equal to the channel spacing of the radiocommunications system concerned. This local oscillator is moreover a complex and bulky element.

BRIEF DESCRIPTION OF THE INVENTION

The invention thus proposes a phase- or frequency-modulated and amplitude-modulated radiofrequency signal generator suitable for radio transmission, comprising:

means for generating a phase or frequency control signal and an amplitude control signal, from a phase or frequency modulation signal and from an amplitude modulation signal;

phase or frequency modulation means comprising an input which receives the phase or frequency control signal, and an output which delivers a phase-modulate radiofrequency signal of substantially constant amplitude;

a variable-gain radiofrequency power amplifier comprising an input which receives the phase- or frequency-modulated radiofrequency signal of substantially constant amplitude, an output which delivers the phase- or frequency-modulated and amplitude-modulated radiofrequency signal, and a gain control input which receives the amplitude control signal, wherein the generating means comprise means of feedback control of the amplitude of the output signal, and, further, means of adaptive predistortion which are arrangd so as, during a phase of continuous operation, to carry out a predistortion of the phase or frequency control signal as a function of the amplitude modulation signal, and so as, during a learning phase, to be adapted on the basis of the amplitude modulation signal and of the amplitude control signal.

The invention allows to compensate for phase nonlinearities in a generator based on the EER technique, and makes it possible among other things, to dispense with the presence of a demodulator together with a local oscillator.

The means of feedback control of the amplitude of the output signal make it possible to compensate for AM/AM conversions. In a preferred exemplary embodiment, these are analog means.

The predistortion means carry out a predistortion of the phase or frequency modulation signal. They make it possible to compensate for AM/PM conversions. Since they operate on the basis of the amplitude modulator signal and of the amplitude control signal, the generator comprises no local oscillator.

The invention also proposes a radiofrequency transmitter, for example for use in a mobile station or a fixed station of a radiocommunications system, comprising a generator as defined hereinabove.

It finally proposes a mobile station and a fixed station of a radiocommunications system comprising such a transmitter, as well as a radiocommunications system, in particular a PMR system, incorporating at least one such mobile station and/or at least one such fixed station.

BRIEF DESCRIPTION OF THE DRAWINGS

FIG. 1, already analyzed is the diagram of the principle of a phase or frequency-modulated and amplitude-modulated radiofrequency signal generator based on the EER technique;

FIG. 2 is the diagram of a loop for analog feedback control of the output amplitude from the power amplifier;

FIG. 3 is the graph of the curve of the phase of the output signal from a power amplifier as a function of the amplitude control signal;

FIG. 6 is the diagram of a radiofrequency transmitter according to the invention;

FIG. 7 is the diagram of a radiocommunications system according to the invention.

DESCRIPTION OF PREFERRED EMBODIMENTS

Figure 4:
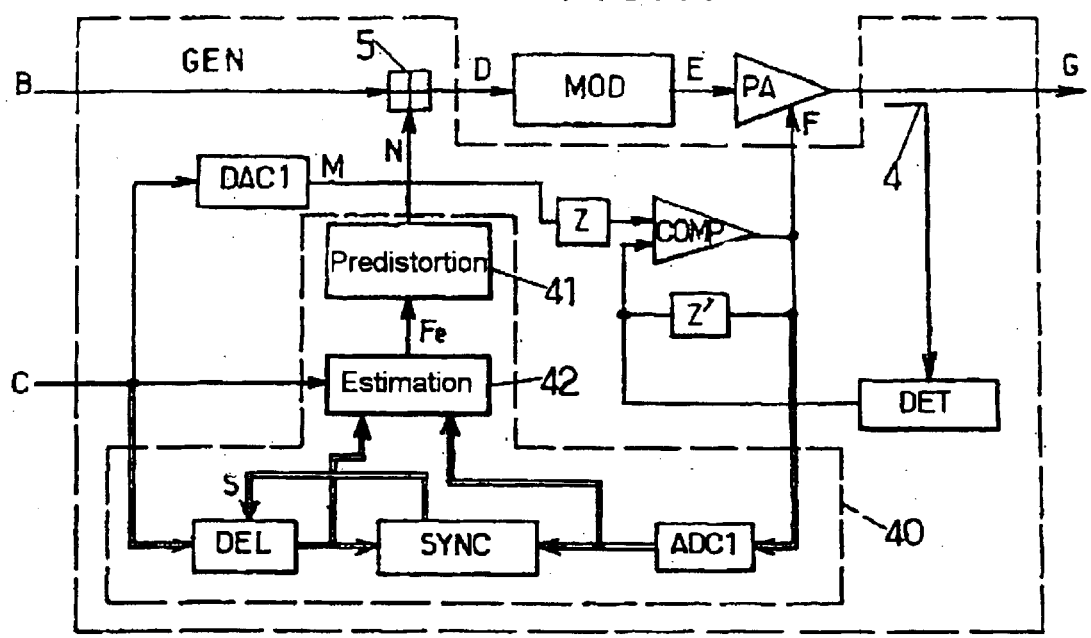
FIG. 4 is the diagram of a first embodiment of a generator according to the invention.

In the figures and in what follows, same elements bear the same references. In what follows, the radiofrequency signal G which is modulated, on the one hand, in phase or in frequency and, on the other hand, in amplitude, is also called the generator output signal. It is a signal suitable for radio transmission, via an antenna or a cable.

The phase- or frequency-modulated and amplitude-modulated radiofrequency signal generator according to the invention is based on the EER technique, the principle of which has been presented in the introduction in conjunction with the diagram of FIG. 1. In the example considered in the present description, the case of phase modulation is envisaged, the invention of course applying also to frequency modulation. For the sake of simplicity, mention of this alternative will not be repeated in what follows.

The phase modulation component is determined by a phase modulation signal B and the amplitude modulation component is determined by an amplitude modulation signal C, these signals being, for example, digital signals.

The diagram of FIG. 2 shows means for compensating for the amplitude nonlinearities (AM/AM conversions) of the power amplifier PA for a generator of the type represented in FIG. 1.

These compensating means comprise means of feedback control of the amplitude of the output signal G, in particular an analog loop for feedback controlling the output signal G to an analog preset M. When, as is the case in the example considered here, the amplitude modulation signal C is a digital signal, the preset M is obtained by digital/analog conversion of this signal via a digital/analog converter DAC1. When on the contrary the amplitude modulation signal C is an analog signal, the preset is constituted directly by this signal.

The analog feedback control loop comprises an amplifier COMP operating as an integrator, a first input of which receives the preset M via an impedance Z, a second input of which receives an analog signal L, and the output of which delivers an amplitude control signal F.

The latter is applied to a gain control input of the amplifier PA. The output of the amplifier COMP is looped onto the second input, via an impedance Z'.

The analog feedback control loop further comprises coupling means, such as a radiofrequency coupler 4, delivering a signal H the image of the output signal G.

It finally comprises a detector DET, the input of which receives the signal H and the output of which delivers the aforesaid signal L. The function of the detector DET is to extract the amplitude modulation component of the output signal G from the signal H, by applying a rectification and a low-pass filtering to the signal H in such a way that the voltage amplitude of the signal L, conventionally expressed in decibels (dBv), is dependent on the instantaneous power of the signal H, conventionally expressed in decibels (dBm). The signal. L is therefore representative of the amplitude modulation component actually present in the output signal G. It should be noted here that the analog feedback control loop, and in particular the detector DET, comprise no local oscillator.

The signal L and the preset M are very close to one another, and differ only through the effect of the AM/AM conversions in the amplifier PA. The signal L is compared with the preset M by the integrator amplifier COMP, which produces the amplitude control signal F as a function of their difference.

The invention proposes a generator based on the EER technique, which not only comprises means of feedback control of the amplitude of the output signal such as those described hereinabove, to compensate for AM/AM conversions, but which further comprises adaptive-phase predistortion means for compensating for AM/PM conversions.

The graph of FIG. 3 shows the curve of the phase φ(G) of the output signal G as a function of the amplitude control signal F which is applied to the gain control input of the radiofrequency power amplifier PA, in the absence of phase modulation. This curve is therefore the curve of the AM/PM conversions as a function of the amplitude control signal F.

As may be seen in this figure, the phase φ(G) varies in a substantially linear manner as a function of F for values of F lying between a value F1 and a value F2 which define a zone encompassing the active zone of the amplifier PA. Stated otherwise, the AM/PM conversions in the generator depend to first order on the amplitude control signal F inside the active zone of the power amplifier PA. Stated otherwise, again, the amplitude control signal F in the operating zone of the power amplifier PA is an image of the AM/PM conversions in the generator. The expression active zone is understood here to mean a zone of normal operation of the power amplifier PA.

Moreover, it can be shown that the influence of the transmission frequency (i.e., the frequency determined by the signal: E) has only a second order effect on the AM/PM conversions, and results in a vertical translation, upward or downward, of the curve φ(G)=f(F) in the zone [F1,F2]. Other parameters also have only a second order influence on the AM/PM conversions. These are in particular the temperature, the supply voltage and the input power of the radiofrequency power amplifier PA.

The observation of the phenomenon above is the basis of the invention. Specifically, the invention proposes that this phenomenon be utilized to carry out, in a learning phase, the adaptation of the means of predistortion in phase which make it possible to compensate for AM/PM conversions. The smaller the depth of amplitude modulation, the better are the results given by this method.

Figure 5:
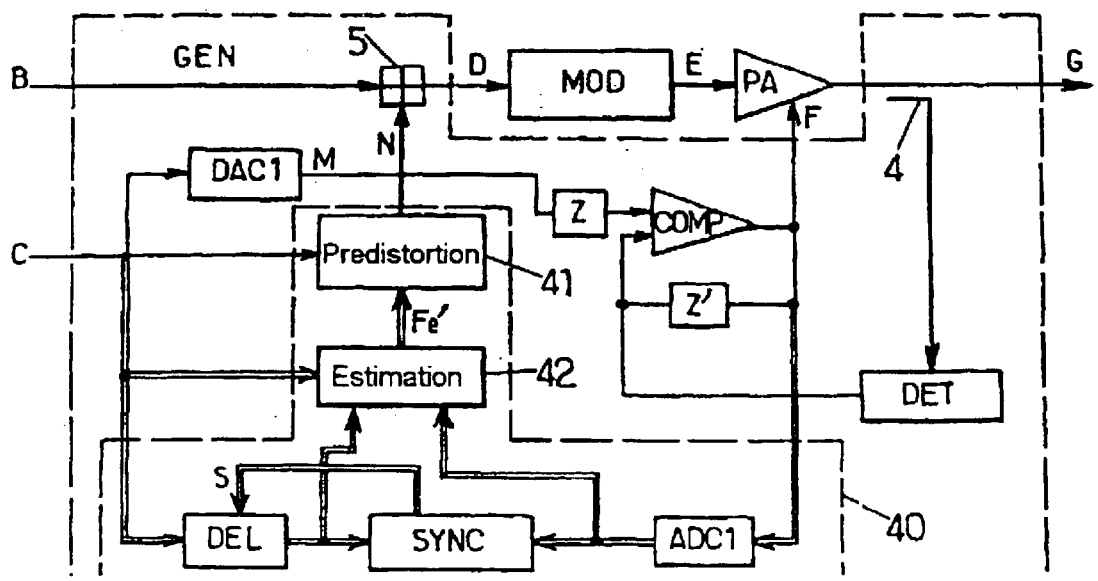
FIG. 5 is the diagram of a second embodiment of a generator according to the invention.

Represented in FIG. 4 and in FIG. 5 are respectively the diagram of a first and a second embodiment of a generator according to the invention. Represented in these figures by double lines are the links between the elements involved only during the learning phase.

The generator comprises means GEN for generating a phase control signal D and an amplitude control signal F, from the phase modulation signal B and from the amplitude modulation signal C, respectively. The signal D may be a digital or analog signal, whereas the signal F is for example an analog signal. The structure of the means GEN will be detailed later.

The generator also comprises phase modulation means MOD, an input of which receives the phase control signal D and an output of which delivers a radiofrequency signal E of substantially constant amplitude and phase modulated, as a function of the phase control signal D.

The means MOD preferably comprise a digital modulation synthesizer (DMS circuit, the abbreviation standing for "Digital Modulation Synthesizer"). In this case, the phase control signal D is a digital signal, which is converted into a frequency control signal upstream of the DMS circuit or in the DMS circuit. A DMS circuit allows better integration of the generator by virtue of its small bulk. Specifically, this bulk is smaller, for example, than that of an analog modulator with phase locked loop (PLL). Furthermore, it exhibits good spectral purity.

As a variant, the means MOD comprise a phase duplication loop, which also exhibits good spectral purity. In this case, the phase control signal D is generated in the form of an in-phase component and a quadrature component.

As a further variant, the means MOD may also comprise a conventional PLL modulator. In this case, the phase control signal D is an analog signal.

The generator finally comprises a variable-gain radiofrequency power amplifier PA, the input of which is coupled to the output of the phase modulation means MOD so as to receive the radiofrequency signal E, a gain control input of which receives the amplitude control signal F, and the output of which delivers a phase- and amplitude-modulated radiofrequency signal, which is the output signal G from the generator. This signal is suitable for radio transmission via an antenna or a cable. Thus, the output of the amplifier PA constitutes the output of the generator, and may be coupled to an antenna or a cable for radio transmission of the signal G.

The amplitude: control signal F may be a gain control signal. It may, for example, be a gate voltage (Vgg) and/or a drain voltage (Vdd) when the amplifier PA is an amplifier based on MOS transistor(s). It may also be a base voltage (Vbb) and/or a collector base voltage (Vcc) when the amplifier PA is an amplifier based on bipolar transistor(s). It may also be the combination of several voltages such as above.

In a likewise envisagable variant, the amplitude modulation is introduced via a variable attenuator. The amplitude control signal F is then an attenuation control signal.

To obtain high power efficiency, the amplifier PA is preferably arranged so as to operate in an operating zone close to saturation. This is why the means GEN comprise means making it possible to compensate for AM/AM conversions and AM/PM conversions, so as to cancel out the effects thereof on the output signal G.

To compensate for AM/AM conversions, the means GEN comprise means of feedback control of the amplitude of the output signal G. In the example represented in FIG. 4, these means comprise an analog loop for feedback control of the amplitude of the output signal G as described hereinabove in conjunction with the diagram of FIG. 2. These means will not be described again.

As a variant, the means of feedback control of the amplitude of the output signal G comprise means of adaptive predistortion of the amplitude modulation signal C. Such predistortion means are in general digital means based on a predistortion algorithm or a table of predistortion values.

To compensate for AM/PM conversions, the means GEN furthermore comprise means 40 of predistortion in phase. The predistortion in phase is adaptive so as to take account of the dispersion of the electronic hardware items that enter into the make up of the generator, and the operating conditions (phenomenon of drifting of the hardware items with aging and, especially, temperature). One therefore distinguishes a continuous operating phase and a learning phase.

During the continuous operating phase, the phase distortion means 40 carry out a predistortion in phase of the phase control signal D as a function of the amplitude modulation signal C. More particularly, the signal D is obtained from the phase modulation signal B by applying a phase predistortion. For this purpose, the means 40 comprise a predistortion module 41, that generates a digital predistortion signal N which is combined with the phase modulation signal B in an operator 5. In one example, the operator 5 computes the digital sum of the values of the signal B and those of the signal N.

The predistortion module 41 is for example a software module, which implements an appropriate predistortion algorithm, as a function of an input parameter. As a variant, a predistortion table is employed, which delivers appropriate values of the predistortion signal, as a function of an input parameter.

During the learning phase, the phase predistortion means 40 are adapted on the basis of the amplitude modulation signal C and of the amplitude control signal F. For this purpose, the adaptive phase predistortion means 40 further comprise an analog/digital converter ADC1, for digitizing the signal F. The adaptation may also take account of the aforesaid parameters having a second order influence on the AM/PM conversions, namely, the transmission frequency, the temperature, the supply voltage, the input power of the radiofrequency power amplifier, etc. This affords further accuracy in learning.

The predistortion means 40 further comprise an estimation module 42 generating an estimated amplitude control signal Fe. The module 42 is for example embodied in the form of software. The signal F digitized by the converter ADC1 is input to the estimation module 42.

The estimation module 42 has as function to estimate, at a given instant during the continuous operating phase, the value of the amplitude control signal F from the value of the amplitude modulation signal C. The module 42 is adapted, during the learning phase, as a function of the amplitude modulation signal C and of the digitized amplitude control signal F. Stated otherwise, the learning phase of the estimation module 42 makes it possible to establish the correspondence between the values of these two signals C and F. As was stated earlier, the signal F then depends, to first order, on the AM/PM conversions induced in the generator. The learning phase of the estimation module 42 therefore makes it possible to establish the correspondence between the values of the phase modulation signal C and the AM/PM conversions induced in the generator.

The amplitude modulation signal C reaches the gain control input of the amplifier PA through the analog feedback control loop and, further, through filters (not represented). In order to take account of the delay stemming therefrom, the signal C must be delayed in a delayer module DEL before being input to the estimation module 42 so as to be compared therein with the digitized amplitude control signal F. A synchronization module SYNC receives the signal delivered by the delayer module DEL and the signal delivered by the converter ADC1, and outputs a synchronization signal S which controls the delayer module DEL in an appropriate manner. The delayer module DEL is for example a driven shift register (i.e., one with controlled delay). The module SYNC is for example a software module, which implements a correlation function.

In the embodiment in accordance with FIG. 4, the input parameter of the predistortion module 41 mentioned hereinabove is the estimated amplitude control signal Fe, which is generated by the estimation module 42 from the amplitude modulation signal C.

Stated otherwise, during the continuous operating phase, the predistortion module 41 is controlled by the estimated amplitude control signal Fe which is delivered by the estimation module 42, the latter being controlled by the amplitude modulation signal C. During the learning phase, the estimation module 42 is adapted on the basis of the amplitude modulation signal C and of the amplitude control signal F, as was stated earlier.

In the embodiment in accordance with FIG. 5, the input parameter of the predistortion module 41 is the amplitude modulation signal C. Stated otherwise, the predistortion module 41 is controlled by the amplitude modulation signal C during the continuous operating phase.

Furthermore, during the learning phase, the predistortion module 41 is adapted on the basis of a signal Fe' representative of the estimated amplitude control signal Fe introduced hereinabove, which is generated by the estimation module 42 from the amplitude modulation signal C.

This embodiment renders the learning phase more complex, but simplifies the continuous operating phase.

FIG. 6 gives the diagram of a radiofrequency transmitter according to the invention.

The transmitter 60 comprises a data input 100 for receiving a digital message A containing data to be transmitted. When the transmitter is used in a mobile station or a fixed station of a radiocommunications system, the input 100 may be linked to the output of a speech coder or of a channel coder.

The transmitter also comprises composite means of coding such as a coder 200 for generating, from the digital message A, a first string of digital values constituting the phase modulation signal B, and a second string of digital values constituting the amplitude modulation signal C.

Owing to the fact that the phase modulation component and the amplitude modulation component are converted from baseband to the radiofrequency domain by separate means, namely respectively by the phase modulation means MbD and by the variable-gain radiofrequency power amplifier PA, the phase modulation component and the amplitude modulation component follow different paths before being combined in the output signal G. Now, depending on the type of coding used, it is necessary for the phase modulation component to be synchronized with the amplitude modulation component in the signal transmitted, in order to allow correct decoding receiver side and satisfactory spectral purity on transmission. It is then desirable to compensate for the differences between the transmission time spans of these two components over their respective paths.

This is achieved by ad-hoc temporal clamping means. These temporal clamping means 50 comprise for example first digital means 51 for applying a delay to the phase modulation component B and/or second digital means 52 for applying a delay to the amplitude modulation component C in such a way that the phase modulation component B is synchronized with the amplitude modulation component C in the output signal G. These digital means may comprise a shift register, a delayer filter (for example a sinc filter), etc. A digital solution such as this has the advantage of allowing good integration of the device.

As a variant, the temporal clamping means comprise analog means, replacing or supplementing the aforesaid digital means. Analog means such as these comprise for example one or more delay lines.

The transmitter furthermore comprises, downstream of the coder 200 and of the temporal clamping means 50, a generator 300 of a phase-modulated and amplitude-modulated signal, as described hereinabove in conjunction with FIGS. 2, 4 and 5.

The transmitter finally comprises a radiofrequency antenna 400, linked to the output of the generator 300. This antenna allows the transmission of the phase- and amplitude-modulated radiofrequency signal, G on the transmission channel. As a variant, the antenna 400 may be replaced by a cable.

Represented diagrammatically in FIG. 7 is a radiocommunications system according to the invention. The system 70 comprises a network subsystem, represented symbolically by a cloud 73. It also comprises a radio subsystem, comprising mobile stations 71 and/or fixed stations 72. The mobile stations 71 are for example portable or handheld terminals. Fixed stations 72 are for example base stations, providing for the radio interface with the mobile stations which are inside their radio coverage zone. As a variant, they may be fixed terminals.

According to the invention, at least one fixed station 71 and/or at least one mobile station 72 of the system 70 are equipped with a radiofrequency transmitter 60 according to the diagram of FIG. 6.

What is claimed is:

1. A phase- or frequency-modulated and amplitude-modulated radiofrequency signal generator suitable for radio transmission, comprising:

means for generating a phase or frequency control signal and an amplitude control signal, from a phase or frequency modulation signal and from an amplitude modulation signal respectively;

phase or frequency modulation means comprising an input which receives the phase or frequency control signal, and an output which delivers a phase- or frequency-modulated radiofrequency signal of substantially constant amplitude;

a variable-gain radiofrequency power amplifier comprising an input which receives the phase- or frequency-modulated radiofrequency signal of substantially constant amplitude, an output which delivers the phase- or frequency-modulated and amplitude-modulated radiofrequency signal, and a gain control input which receives the amplitude control signal, wherein the generating means comprise means of feedback control of the amplitude of the output signal, and, further, means of adaptive predistortion which are arranged so as, during a phase of continuous operation, to carry out a predistortion of the phase or frequency control signal as a function of the amplitude modulation signal, and so as, during a learning phase, to be adapted on the basis of the ampiltude modulation signal and of the amplitude control signal.

2. The generator of claim 1, wherein the adaptive predistortion means comprise a predistortion module, and an estimation module producing an estimated amplitude control signal from the amplitude modulation signal.

3. The generator of claim 2, wherein, during the phase of continuous operation, the predistortion module is controlled by the estimated amplitude control signal and the estimation module is controlled by the amplitude modulation signal, and wherein, during the learning phase, said estimation module is adapted on the basis of the amplitude modulation signal and of the amplitude control signal.

4. The generator of claim 2, wherein, during the phase of continuous operation, the predistortion module is controlled by the amplitude modulation signal, and wherein, during the learning phase, the predistortion module is adapted on the basis of a signal representative of the estimated amplitude control signal.

5. The generator of claim 1, wherein the means of feedback control of the amplitude of the output signal are analog means.

6. The generator of claim 5, wherein said analog means of feedback control of the amplitude of the output signal comprise coupling means delivering a signal the image of the output signal, a detector an input of which receives the signal the image of the output signal and an output of which delivers a signal representative of the amplitude modulation component present in the output signal, a comparator, a first input of which receives the amplitude modulation signal, second input of which receives said signal representative of the amplitude modulation component actually present in the output signal, and the output of which delivers the amplitude control signal which is applied to the gain control input of the power amplifier.

7. The generator of claim 1, wherein the generating means comprise means of temporal clamping of the phase or frequency control signal and of the amplitude control signal in such a way that the phase or frequency modulation component is synchronized with the amplitude modulation component in the output signal.

8. A radiofrequency transmitter comprising a generator as claimed in claim 1.

9. A mobile station of a radiocommunications system, comprising a transmitter as claimed in claim 8.

10. A radiocommunications system, comprising at least one mobile station as claimed in claim 9.

11. A fixed station of a radiocommunications system, comprising a transmitter as claimed in claim 8.

12. A radiocommunication system comprising at least one fixed station as claimed in claim 11.

* * * * *